Nov. 16, 1948.　　　　J. B. McFADDEN　　　　2,453,924
CREAM SEPARATOR AND HOMOGENIZER
Filed Oct. 17, 1944　　　　　　　　　　2 Sheets-Sheet 1
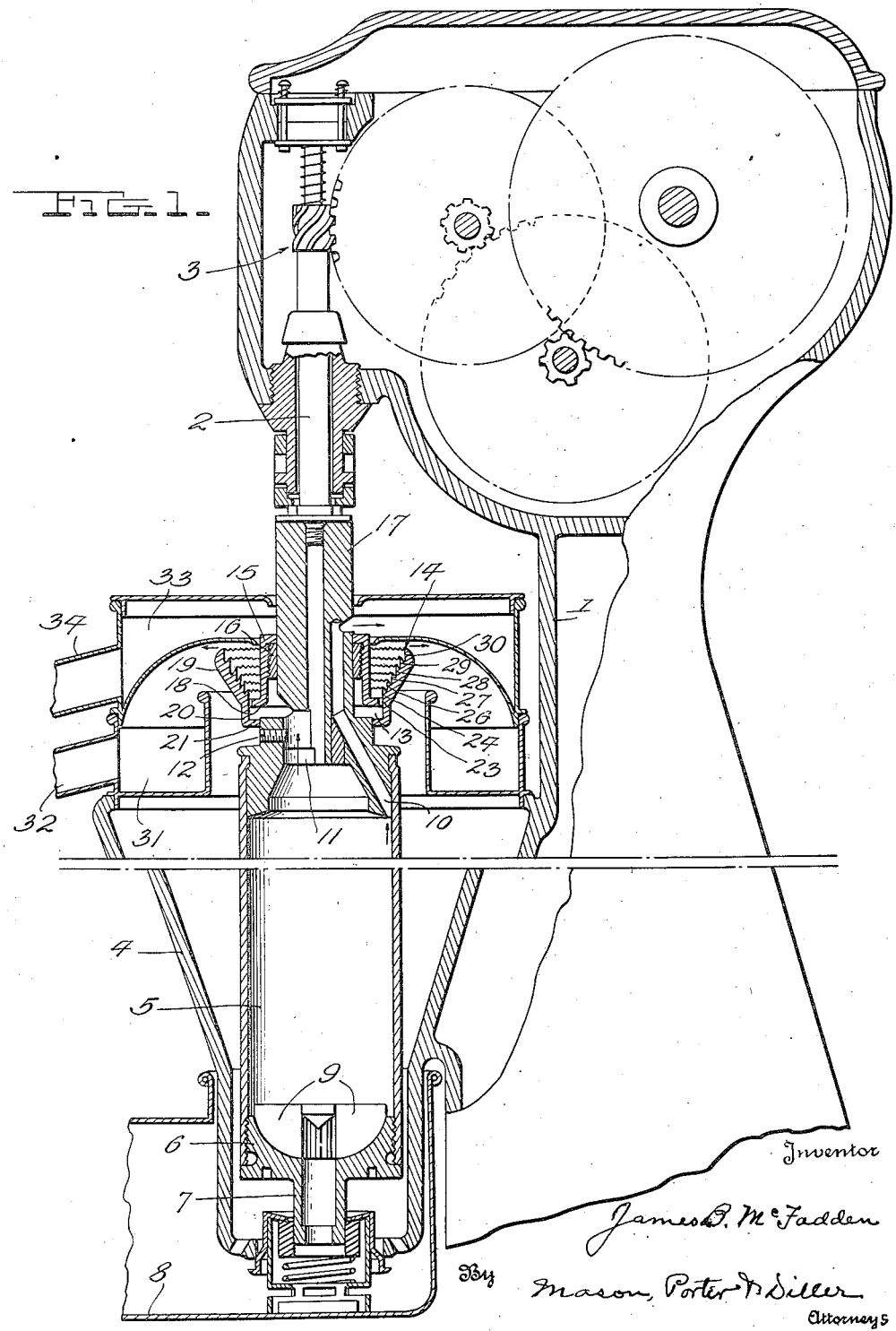

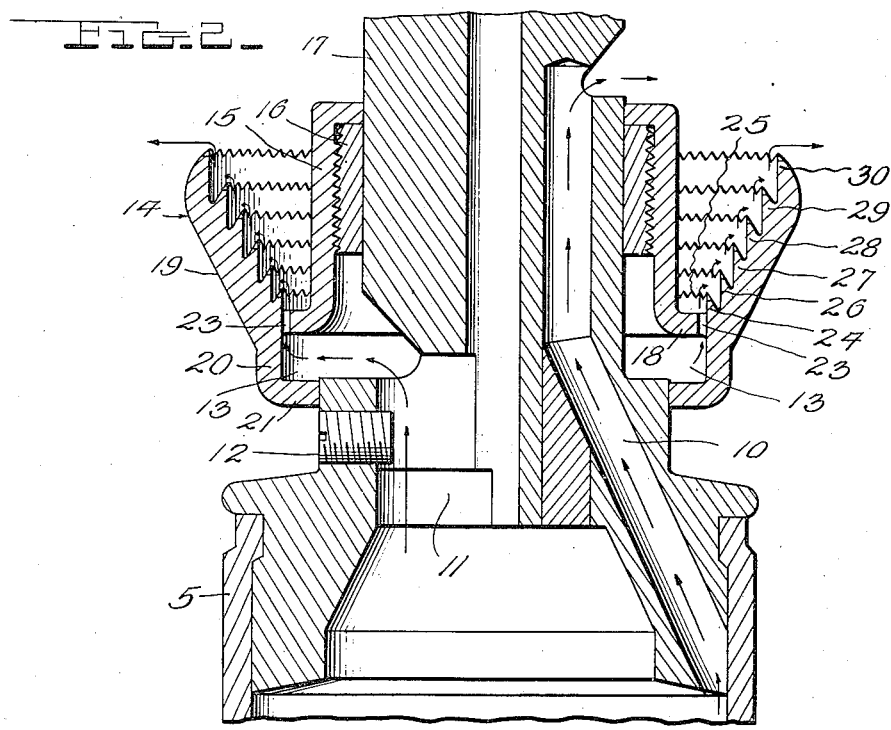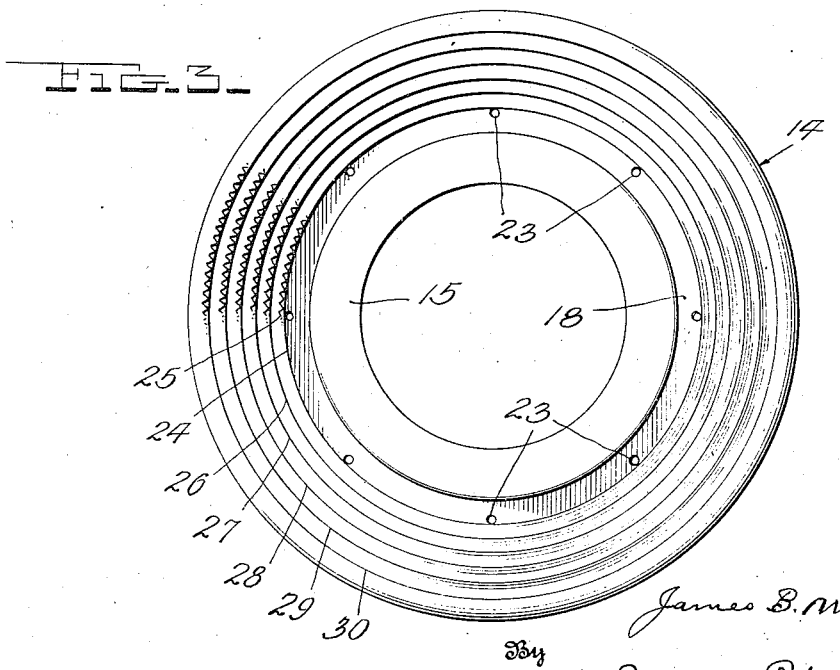

Patented Nov. 16, 1948

2,453,924

UNITED STATES PATENT OFFICE 2,453,924

CREAM SEPARATOR AND HOMOGENIZER

James B. McFadden, West Chester, Pa., assignor to United Dairy Equipment Company, West Chester, Pa., a corporation of Pennsylvania Application October 17, 1944, Serial No. 559,047

5 Claims. (Cl. 233—28)

1

The invention relates to new and useful improvements in a machine for homogenizing cream.

An object of the invention is to provide a machine which is equipped with means for separating the cream from whole milk and also with means operating upon the separated cream stream for homogenizing the cream.

A further object of the invention is to provide a machine of the above type wherein the homogenizing means rotates at the same speed as the separating means.

A still further object of the invention is to provide a machine of the above type wherein the cream stream is divided into small streams for the homogenizing of the cream.

A still further object of the invention is to provide a machine of the above type wherein the homogenizing means includes a series of radially spaced blades against which the cream streams and films are impacted for the homogenizing of the cream.

These and other objects will in part be obvious and will in part be hereinafter more fully described.

In the drawings,

Figure 1 is a vertical sectional view showing the improved machine for homogenizing cream;

Figure 2 is an enlarged sectional view of the upper end of the bowl and the homogenizing means which is attached thereto and rotates therewith.

Figure 3 is a plan view of the homogenizing means.

The invention has to do with a machine which is equipped with means for separating cream from whole milk. The machine is also equipped with means whereby the cream stream flowing from the separating means is divided into small streams and films which are in turn impacted against rings or blades for the homogenizing of the cream. These rings or blades are arranged concentrically of the bowl and are radially spaced so that advantage can be taken of increasingly stronger centrifugal force to aid in the efficient homogenization of the cream.

Referring in detail to the drawings which show one embodiment of the invention, the machine includes a supporting frame 1 in which is mounted a rotating spindle 2. The spindle is operated by a worm gear 3 from any suitable source. The frame 1 is provided with a casing 4 in which a bowl 5 is located. This bowl is suspended by the spindle 2 and is rotated thereby. The lower end of the bowl is closed by an end member 6 which is

2 provided with a passage 7 leading to a feed cup 8. Whole milk placed in the feed cup is fed into the bowl 5 through this passage 7. The milk is divided by the separating blades 9 and caused to flow upwardly through the bowl. Centrifugal force operating upon the whole milk flowing through the bowl will cause the cream to be separated from the whole milk and be discharged from the bowl in a cream stream.

The skim milk flows along the wall of the bowl and leaves the bowl through the passage 10. The cream will leave the bowl through the passage 11. The screw 12 extends into the path of the flowing cream and by adjusting this screw the fat percentage of the cream is governed. This cream separating means is of the usual character and further detailed description thereof is not thought necessary.

The cream as it leaves the passage 11 is collected in a feed chamber or well 13 formed at the lower portion of the homogenizer 14. The homogenizer consists of a sleeve 15 which has threaded connection with a collar 16 secured to the head 17 of the separator bowl. This sleeve 15 therefore rotates with the bowl at the same speed as the bowl. The sleeve at its lower end has an outwardly turned part 1 and this outwardly turned part carries the outer wall of the homogenizer 14. This outer wall which is indicated at 19 is preferably formed integral with the sleeve. Said outer wall depends from the lower end of the sleve as indicated at 20 and is inturned at 21 so as to engage the head of the bowl and thus form the chamber or well 13 which is annular in construction. The passage 11 through which the cream flows is connected with this chamber 13. Leading from the chamber 13 are a series of small openings 23. The cream collecting in the chamber 13 is forced out through these openings 23 in a series of small streams. The cream flows into this chamber 13 in a single stream, as illustrated in the drawings.

These several cream streams flowing from the openings 23 will pass along the inner wall of the blade 24 and over the serrated edge 25 thereof where it will be discharged so as to be impacted by centrifugal force against the next adjacent blade 26. The cream impacted against the blade 26 will flow along the blade and be discharged from the serrated edge thereof and will be impacted against the next blade 27, and so on with the blades 28, 29 and 30. From the blade 30 the cream which has been thoroughly homogenized will be collected in the receptacle 31 and discharged from the machine through the spout 32. The skim milk is collected in the receptacle 33 and is discharged through the spout 34.

When the cream stream leaves the chamber 13 it is divided as noted above and the small streams and films thus formed will flow along the blades in succession, spreading out and thinning and at the same time the centrifugal force will be increased as these particles of cream are impacted against the walls of the blades, one after another. The globules of butter fat will be ruptured and broken and the cream will be thoroughly homogenized before it leaves the uppermost blade 30 of the homogenizer. It is understood, of course, that this homogenizer may be differently constructed, or may have a greater number of blades, but it is essential that there shall be a dividing of the cream stream leaving the separator into a series of small flowing streams and films which when impacted against rotated surfaces, will result in the rupturing of the butter fat globules and a thorough homogenization of the cream.

It is also essential that the small cream streams and films shall be impacted in succession against rotating blades for the rupturing, tearing and cutting of the butter fat globules. The serrations at the discharge edge of the blades serve to ensure that the cream will rotate with the blade and also aid in shearing and tearing and rupturing of the butter fat globules.

It is obvious that many changes may be made in the details of construction without departing from the spirit of the invention as set forth in the appended claims.

I claim:

1. A cream separator and homogenizer comprising means for separating the cream from whole milk and means for receiving the cream stream, dividing said stream into small continuous streams and means for impacting the same in succession against vertical surfaces on overlapping rotating blades until the cream is thoroughly homogenized.

2. A cream separator and homogenizer comprising means for separating the cream from whole milk and means for receiving the cream stream, dividing said stream into small continuous streams and means for impacting the same in succession against vertical surfaces on overlapping rotating blades of increasing radius until the cream is thoroughly homogenized.

3. A cream separator and homogenizer comprising a rotating bowl, means for feeding whole milk into said bowl and along the wall thereof for separating the cream from the whole milk, a homogenizer attached to said bowl and rotating therewith, said homogenizer having a closed chamber into which the cream stream is discharged from the separating bowl and a series of small openings through which the cream is discharged by centrifugal force from said chamber in continuous streams, said homogenizer having a series of radially spaced overlapping vertically arranged blades over which the small streams flow and from the free edges of which said streams are discharged and impacted against the vertical surfaces of outwardly spaced blades whereby the cream is homogenized.

4. A cream separator and homogenizer comprising a rotating bowl, means for feeding whole milk into said bowl and along the wall thereof for separating the cream from the whole milk, a homogenizer attached to said bowl and rotating therewith, said homogenizer having a closed chamber into which the cream stream is discharged from the separating bowl and a series of small openings through which the cream is discharged by centrifugal force from said chamber, said homogenizer having a series of blades over which the small streams flow and from the free edges of which said streams are discharged and impacted against the vertical surfaces of outwardly spaced overlapping vertically arranged blades whereby the cream is homogenized, each of said blades being spaced radially from each other and having the free edge thereof serrated.

5. A cream separator and homogenizer comprising a rotating bowl, means for feeding whole milk into said bowl and along the wall thereof for separating the cream from the whole milk, a homogenizer attached to the bowl and rotating therewith for receiving the cream and for homogenizing the same, said homogenizing means including a series of radially spaced vertically arranged blades projecting above and overlapping each other successively from the inner one to the outer one, each of said blades having a circumferentially continuous inner impact receiving vertical face terminating in a free edge which is spaced away from the impact receiving face of the next outer blade whereby the butter fat globules released from the free edge of one blade are imparted by centrifugal force against the next outer blade for the homogenization of the cream.

JAMES B. McFADDEN.

REFERENCES CITED

The following references are of record in the file of this patent:

UNITED STATES PATENTS

| Number | Name | Date |
|---|---|---|
| 447,530 | Wahlin | Mar. 3, 1891 |
| 519,691 | Andersson | May 15, 1894 |
| 1,382,765 | Dixon | June 28, 1921 |
| 2,180,301 | Saylor | Nov. 14, 1939 |